(12) United States Patent
Montague

(10) Patent No.: US 6,581,715 B2
(45) Date of Patent: *Jun. 24, 2003

(54) DRIVETRAIN SYSTEM FOR VEHICLES HAVING A BRAKE ASSEMBLY

(76) Inventor: Martin B. Montague, 19740 Three Notch Rd., Lexington Park, MD (US) 20653

( * ) Notice: Subject to any disclaimer, the term of this patent is extended or adjusted under 35 U.S.C. 154(b) by 0 days.

This patent is subject to a terminal disclaimer.

(21) Appl. No.: 09/934,591

(22) Filed: Aug. 23, 2001

(65) Prior Publication Data

US 2001/0052435 A1 Dec. 20, 2001

Related U.S. Application Data

(62) Division of application No. 09/372,586, filed on Aug. 12, 1999, now Pat. No. 6,305,487.
(60) Provisional application No. 60/096,530, filed on Aug. 13, 1998.

(51) Int. Cl.[7] ............................................. B60K 17/00
(52) U.S. Cl. ................ 180/350; 180/348; 280/124.167; 188/17; 188/18 A
(58) Field of Search .................. 280/124.106, 124.167, 280/124.116, 124.128; 180/348, 347, 350, 357; 188/17, 18 R, 18 A

(56) References Cited

U.S. PATENT DOCUMENTS

| 1,182,104 | A |   | 5/1916  | Remy et al.      |        |
|-----------|---|---|---------|------------------|--------|
| 1,345,421 | A |   | 7/1920  | Van Vleet et al. |        |
| 3,292,943 | A |   | 12/1966 | Crockett         |        |
| 3,473,821 | A |   | 10/1969 | Barenyi et al.   |        |
| 3,605,929 | A |   | 9/1971  | Rolland          |        |
| 4,003,443 | A |   | 1/1977  | Boughers         |        |
| 4,429,760 | A |   | 2/1984  | Koizumi et al.   |        |
| 4,461,365 | A | * | 7/1984  | Diggs ........... | 180/11 |

(List continued on next page.)

FOREIGN PATENT DOCUMENTS

| DE | 3044899 | 6/1982 |
| GB | 2116498 | 9/1983 |
| IT | 520299  | 3/1955 |

OTHER PUBLICATIONS

"Student's Suspension Design Wins Collegiate Inventor Prize", *Engineering News*, Newsletter of the GW School of Engineering and Applied Science, Fall 1998, vol. 2, No. 2, p. 1.
Bob Jackson, "Where To Now?", *Motorcycle Product News*, Jul. 1998, vol. 24, No. 7, pp. 21–25.

*Primary Examiner*—Paul N. Dickson
*Assistant Examiner*—Faye Fleming
(74) *Attorney, Agent, or Firm*—Nixon Peabody LLP; Thomas W. Cole

(57) ABSTRACT

An integrated semi-independent suspension and drivetrain system for a vehicle including a swing arm with a swing mount for pivotally mounting the swing arm to the vehicle, an axle carrier for mounting an axle assembly, the axle carrier being rotatably mounted to the swing arm to allow the axle assembly to roll about a suspension roll axis, a driven sprocket substantially centrally attached to the axle assembly for rotating the axle assembly, a drive sprocket for transferring rotational power to the driven sprocket, a flexible coupling mechanically linking the driven sprocket to the drive sprocket to allow transfer of rotational power from the drive sprocket to the driven sprocket, a constant velocity joint centrally disposed on the drive sprocket axle to allow alignment of the drive sprocket relative to the driven sprocket, and a CV guide for aligning the drive sprocket with the driven sprocket. The integrated semi-independent suspension and drivetrain system may also include a brake assembly where the driven sprocket includes a brake surface. In addition, the integrated semi-independent suspension and drivetrain system may also include a left axle and a right axle and the driven sprocket may include a differential gear system to allow the left axle to rotate at a different rotational speed compared to the right axle.

35 Claims, 5 Drawing Sheets

U.S. PATENT DOCUMENTS

| | | |
|---|---|---|
| 4,469,188 A | 9/1984 | Mita |
| 4,520,890 A | 6/1985 | Marier |
| 4,582,157 A | 4/1986 | Watanabe |
| 4,647,067 A | 3/1987 | Paquette et al. |
| 4,877,102 A | 10/1989 | Stewart |
| 5,107,952 A | 4/1992 | Matsubayashi et al. |
| 5,467,839 A | 11/1995 | Yoshio |
| 5,575,352 A | 11/1996 | Suzuki et al. |
| 5,845,918 A | 12/1998 | Grinde et al. |
| 5,871,218 A | 2/1999 | Lepage et al. |
| 5,878,479 A | 3/1999 | Dickerson et al. |
| 5,890,980 A | 4/1999 | Heyng |
| 5,921,341 A | 7/1999 | Atkins |
| 5,992,587 A | 11/1999 | Maldonado |
| 6,283,255 B1 | 9/2001 | Gardner et al. |

\* cited by examiner

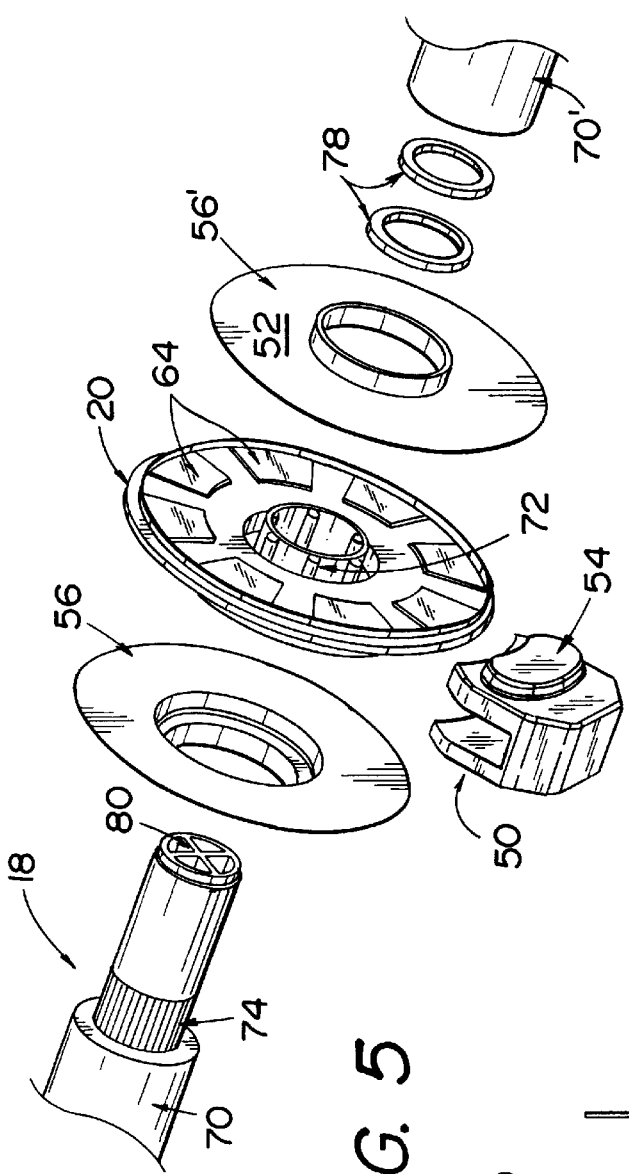
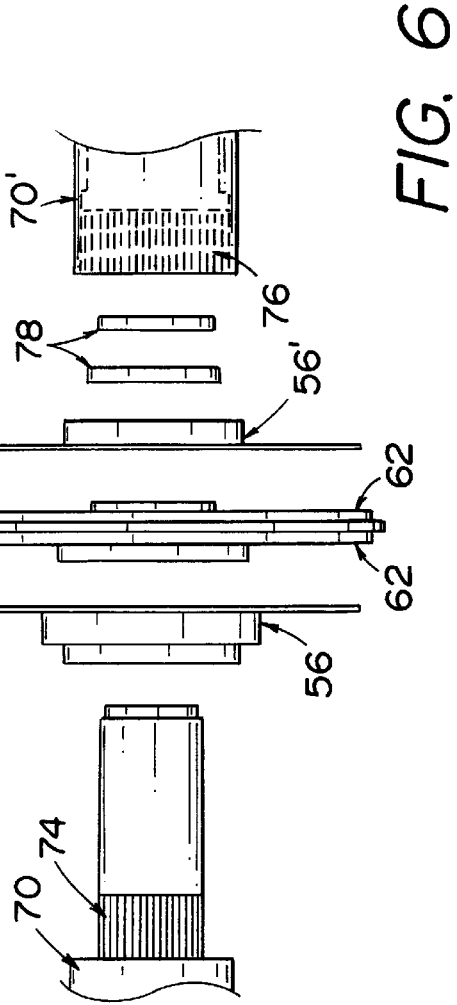
FIG. 5
FIG. 6

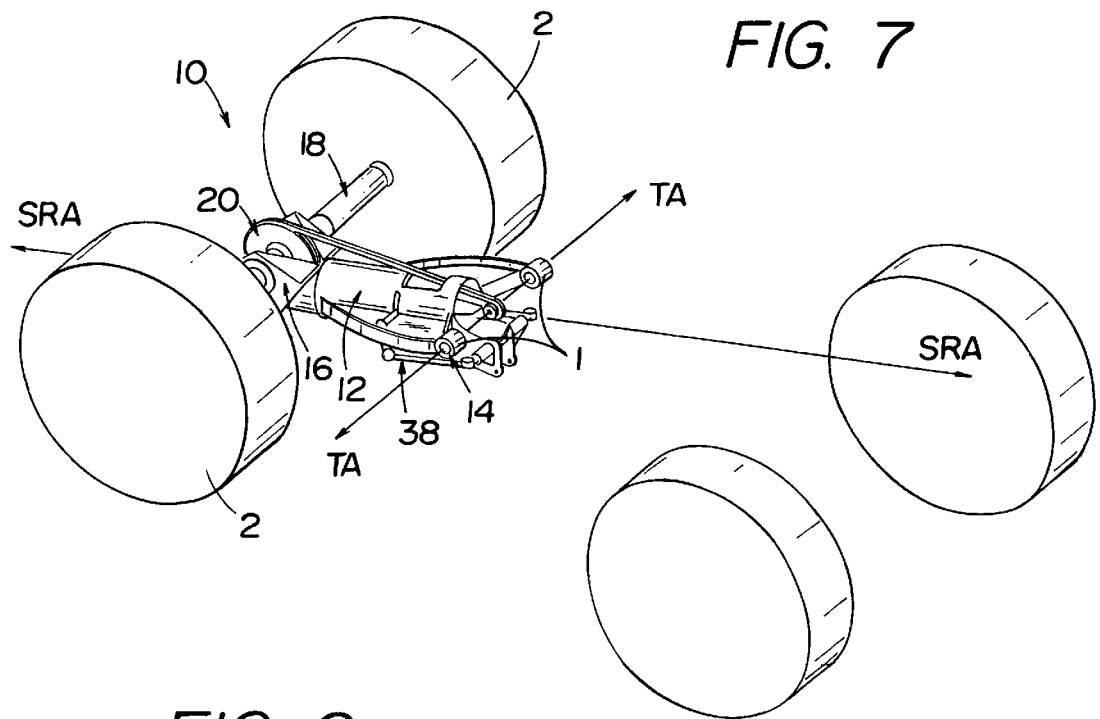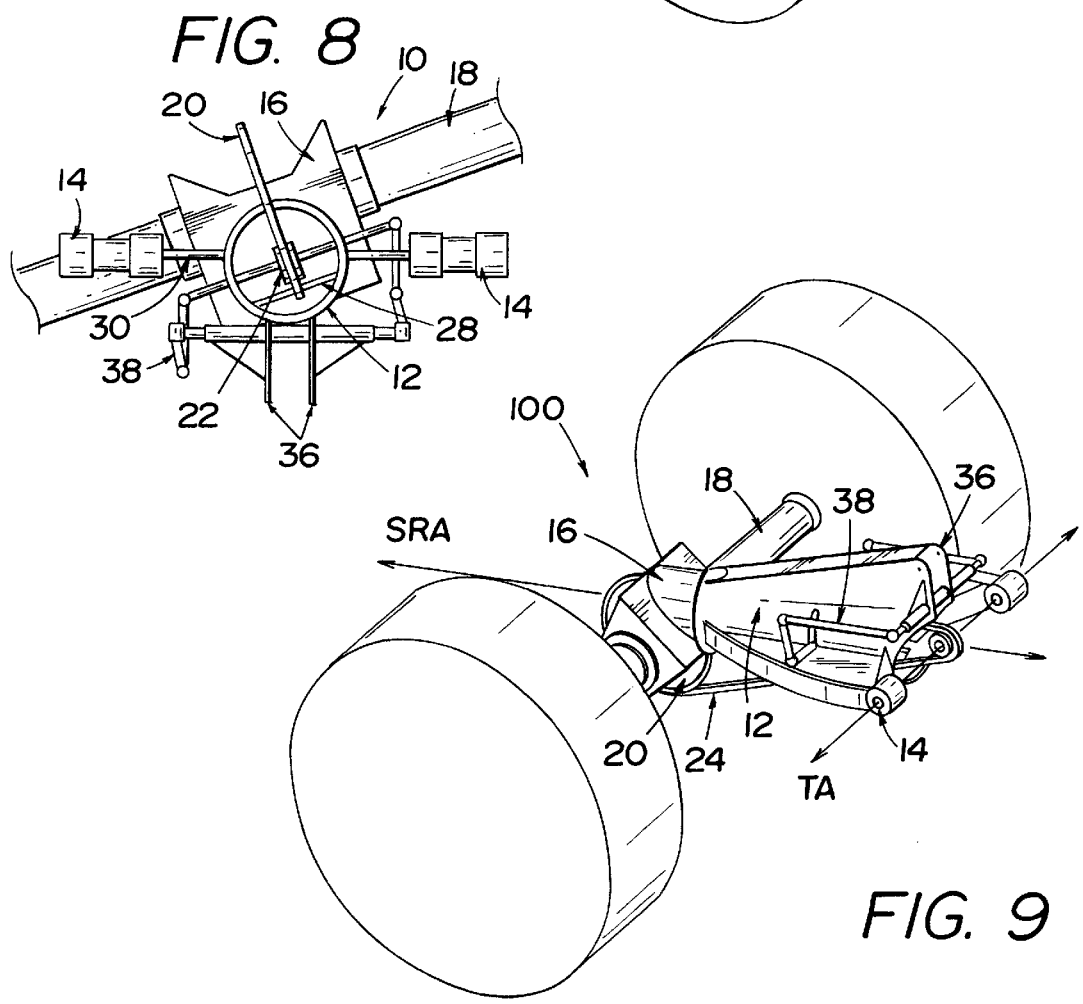

DRIVETRAIN SYSTEM FOR VEHICLES HAVING A BRAKE ASSEMBLY

This is a divisional application of Ser. No. 09/372,586, filed Aug. 12, 1999 now U.S. Pat. No. 6,305,487, which claims priority to provisional application Ser. No. 60/096,530, filed Aug. 13, 1998.

BACKGROUND OF THE INVENTION

1. Field of the Invention

The present invention is related to the field of vehicle suspensions and drivetrains. More specifically, the invention relates to semi-independent suspensions and drivetrains for vehicles.

2. Description of Related Art

Numerous designs for suspension and drivetrain systems are known and used in the manufacturing of various types of vehicles. It is known in vehicle engineering that particular designs provide specific advantages in particular applications. Most of the developments in the designing of suspension and drivetrain systems have been centered around automotive applications.

In recent times, smaller specialized all-terrain vehicles (a.k.a. ATVs) have gained in popularity as recreational and utility vehicles. As the popularity of ATVs has increases, so to have the performance demands placed upon them. Consequently, manufacturers of ATVs have responded with performance increases in certain areas, such as, increases in engine power and vehicle size. Such increases in engine output and vehicle size translate into increased inertial effects and extreme dynamic loading. These more powerful, massive ATVs usually require more skill and/or effort by the operator to maintain control during operation. However, ATV manufacturers have had very little success in modifying the previously mentioned automotive suspension and drivetrain designs to optimally adapt them for ATV use.

ATVs require the development of specialized suspension and drivetrain systems to improve operator controllability while continuing to withstand the rugged demands of their off-road application. Typically, ATVs have one or two front wheels and two rear wheels axially mounted on a solid axle in a dependent manner by a swing arm that pivots about a transverse axis of the ATV. Such a system is illustrated in U.S. Pat. No. 4,582,157 to Watanabe. The limitation and disadvantage of this suspension and drivetrain design is that the two rear wheels are mounted on a solid axle, which is axially coupled to a swing arm in such a way that it is only allowed to pivot about, and constrained to be parallel with, the transverse axis of the ATV.

Currently, the three and four wheeled ATVs using the '157's design, yield three undesirable characteristics that have negative effects on vehicle stability. The first two of these undesirable characteristics are in effect during both forward and turning or cornering operations of the ATV. These two characteristics are termed in vehicle engineering as suspensions having a roll center at ground level and possessing infinite roll resistance.

Having the roll center at ground level results in poor roll stability because the center of gravity (a.k.a. CG) of the vehicle can only be designed far above the vehicle's longitudinally oriented roll axis, potentially resulting in increased dynamic roll moment (a.k.a. torque). Infinite roll resistance implies that the suspension doesn't incorporate any roll motions to absorb roll energies. This means that all of the energy that is transferred via the unsprung mass (a.k.a. unsprung weight) from dynamic roll loading, is transferred directly into rolling the sprung mass (a.k.a. sprung weight) of the vehicle. Thus, infinite roll resistance translates into a harsh ATV dynamic roll response that is often difficult to predict and control by the operator. Even during simple forward motion, operating such an ATV can be like riding a twisting, bucking bronco when traversing uneven off-road terrain.

The third undesirable characteristic comes into play when the solid axle drivetrain of the '157 patent is used and the operator is attempting to negotiate the ATV to turn or corner. For the operator to negotiate the ATV around a turn, a sufficient turning moment must be generated by the operator to overcome all resistive turning moments. Usually, these resistive turning moments are primarily caused by inertial effects, which are overcome by the operator simply turning the front steering mechanism of the ATV. This steering action imparts the needed centripetal reaction from the front tires to overcome the inertial turning moments that work to maintain forward motion of the ATV.

This third undesirable characteristic, which is imparted due to the solid axle constraining the rear wheels to rotate at the same speed, is a mechanical counteracting turning moment, and it's contribution is only present while both rear tires are in sufficient traction with the terrain. This mechanical counteracting turning moment causes the ATV to experience a condition termed as understeer. For the operator to better negotiate this ATV to turn, one must overcome this understeer effect. This is typically accomplished by the operator leaning outward to shift the CG of the sprung mass such that a sufficient roll moment is imparted to cause the inside rear tire to lose traction with the terrain, thereby decoupling the mechanical counteracting turning moment caused by the solid axle. Thus, the operator must perilously put the ATV in an unsafe and unstable inertia induced roll condition in order to eliminate or reduce the mechanically induced understeer effect.

The sudden removal of this counteracting turning moment results in a nearly instantaneous transition from a quasi-static understeer condition to a sharp oversteer condition. This oversteer works to worsen the preexisting unstable inertia induced roll condition. Depending on the skill and strength of the operator, this situation can result in a rapid loss of operator roll control and vehicle rollover.

In light of the disadvantages inherent in the above suspension and drivetrain system, it has been recognized that significantly improved vehicle roll dynamics could be obtained if the rear suspension was designed such that the rear axle could also pivot about the vehicle's longitudinally oriented roll axis. These types of semi-independent suspensions offer variably finite roll resistance characteristics which are desirable for increased roll stability and traction.

The most important function of any suspension is to keep the tires in contact with the ground, while maximizing stability. Semi-independent rear suspension motion is all that is necessary for off-road ATV applications because the tires used are of low pressure, and they have rounded shoulders with radical tread patterns extending well into the sidewall region. These tire characteristics nullify the need of having a fully independent suspensions because the tires provide good compliance and traction with the terrain, even if the motion of one side of the suspension moderately affects the other.

In this regard, U.S. Pat. No. 5,845,918 to Grinde et al. discloses an ATV with a semi-independent rear suspension which allows the rear axle to pivot about the vehicle's longitudinal centerline as well as about a transverse axis. This suspension design has been found to substantially improve handling performance of the ATV by giving improved traction on uneven terrain and increased vehicle roll stability. In particular, during cornering, these semi-independent suspensions help roll stability because they postpone the initiation of the transition from understeer to oversteer. For the operator, a quasi-static understeer condition is easier to control than the rapid transition condition to a sharp oversteer.

The suspension system of the '918 patent however, does not totally resolve the third undesirable characteristic explained above, since it too uses a solid rear axle. In addition, the suspension design of the '918 patent severely limits the travel of the rear axle since the travel is limited by the travel of the coil-over shocks, which are displaced in near one to one ratio with the displacement of the rear axle. Thus, the suspension disclosed in the '918 patent is undesirable for ATV applications, especially for high performance applications, where amount of travel in a suspension is considered critical for optimal traction, energy absorption, and operator control.

Furthermore, the drivetrain of the '918 patent is like the other prior art suspension and drivetrain systems which typically utilize a drive shaft with a final drive bevel gear which are housed in a shaft housing and a final drive housing. As can be easily appreciated, these components are all made of metal and are quite massive thereby adding to the unsprung mass of the ATV.

Increased mass translates into power robbing inertial drivetrain losses, poor suspension response, and decreased overall power to mass (a.k.a, power to weight) ratio, which is very critical in high performance racing applications where maximum acceleration is imperative. More specifically, it is important to minimize the unsprung mass so that wheel hop frequencies are much higher than the sprung mass natural frequencies. This helps to ensure that the sprung mass remains relatively stable during wheel hop. Thus, a lesser unsprung mass provides superior suspension response and vehicle handling characteristics.

Lastly, because of the bulkiness of the suspension components and the presence of the drive shaft housing and the final drive housing in the prior art designs, there is no effective manner for providing a cost effective precision braking system for the rear wheels. In particular, it is well recognized that disk brake systems are especially desirable in high performance applications. Generally, disk brake systems provide more precise braking control than drum brake systems and are less massive, thus again, minimizing the unsprung mass and drivetrain inertial effects.

However, because the drive shaft housing and the final drive housing are generally positioned substantially center of the rear axle in a conventional ATV, they pose severe packaging constraints for a disk braking system. Thus, many ATVs incorporate the easier to package, yet less precise and more massive drum brakes at the outward ends of the axle housing, the only place possible for robust braking. Having these added braking masses outward from the central region of the axle further worsens the unsprung mass dynamic roll response by increasing the unsprung mass radius of gyration (a.k.a. polar moment of inertia).

One method of reducing the unsprung mass and reduce the bulkiness of the drivetrain is to utilize a chain and sprocket drive coupling such as those used in motorcycles, where they have proven to be superior to all other methods of drivetrain coupling for off-road applications. Chains and sprockets are less massive as compared to drive shafts and final drive bevel gears, and they provide a very responsive coupling of the drive wheels to the transmission. They also take up only minimal amount of space and impose only minimal packaging constraints for a disk braking system. Further, flexible couplings, including chains, absorb drivetrain shock, in the form of strain energy, providing a smoother coupling than that provided by shaft and gear drivetrain systems which often induce shock themselves because of gear lash issues.

However, the use of a conventional chain and sprocket drive system does not allow the rear axle to pivot about the vehicle's longitudinally oriented roll axis, for these chain couplings require that their elements remain planar. These conventional chain drive system typically incorporate a drive sprocket which is attached to the transmission and is in a fixed orientation, and a driven sprocket which spins about the drive axis and is constrained to pivot about, and remain parallel to, the rear transverse axis.

In other applications, special sprockets have been designed to allow the use of a chain and sprocket drivetrain while providing some amount of roll movement. Such drive sprockets are illustrated in U.S. Pat. No. 4,469,188 to Mita which is directed to an articulated tricycle including a drivetrain with a drive sprocket located about a shaft with a constant velocity universal joint employed to allow some flexibility between the sprocket and the shaft. The driven sprocket of the '188 patent is coupled to the solid rear axle by a chain for driving the rear wheels such that the front body of the tricycle may roll slightly relative to a rear body of the tricycle. However, application of the chain and sprocket drivetrain of the '188 patent has been found to be very difficult and inadequate in applications where large suspension travel and low unsprung mass are desired such as in an ATV application. The rear wheels of the '188 patent are supported primarily through the constant velocity universal joint housing and is inadequately supported for off road use. Furthermore, relative to the embodiment being discussed, the '188 patent, again, does not totally resolve the third undesirable characteristic explained above, since it too uses a solid rear axle, albeit because the two rear wheels are so close together and are so small, the resistance will be smaller than the other aforementioned prior art. Moreover, there are no easy ways to provide for the superior characteristics of a disk braking system.

U.S. Pat. No. 4,877,102 to Stewart discloses a multi-wheeled vehicle suspension and drive mechanism for ATVs including a rear axle assembly which allows the rear axle to roll. The '102 patent also discloses a sprocket and chain drive system including a driven sprocket with a universal joint which is mounted to the axle and aligned with the drive sprocket by a pivot arm which is mounted to the swing arm. Whereas the suspension and drive mechanism of the '102 patent allowed larger suspension travel and roll than the design of the '188 patent, the design disclosed in the '102 patent is complicated, requiring many numerous components. In particular, because the design disclosed in the '102 patent includes an axle housing and its associated components, which are all quite massive, and they counteract some of the benefits of using a chain drive in the first place since all of these additional components act to increase unsprung mass. In addition, because of the complexity, the design disclosed in the '102 patent is cost prohibitive to manufacture. Furthermore, because of the relative complexity of the system, it has been found to be unreliable, especially since dirt and debris tended to accumulate in the various components of the universal joint as well as the other exposed components. Lastly, it still fails to resolve the third undesirable characteristic explained above, since it too uses a solid rear axle. Consequently, this suspension and drive mechanism has not been readily accepted and is not commonly used.

Thus, despite the many disadvantages and limitations of commonly used ATV suspensions and drivetrains, they remain in use because there have yet to be any known practical alternatives which will practically avoid the aforementioned undesirable characteristics. Further, these commonly used rear suspension and drivetrain systems are accepted because some offer the required large range of suspension travel needed for added ground clearance and energy absorption. They are simple, tough, and packaged to minimize effects of collision with ground debris.

There are many other suspension and drive designs that could offer improved roll stability characteristics but at the expense of decreased suspension travel, reduced available ground clearance, and less energy absorption ability. These on-road, automotive type suspension systems are optimally suited for street applications where flat faced lower profile tires are used. Further, these designs are more complex, massive, and require packaging that is more vulnerable to collision with ground debris.

For the foregoing reasons, there exists an unfulfilled need for an improved semi-independent suspension and drivetrain system for vehicles which will enable improved roll and traction performance by allowing the axle to pivot about a vehicle's longitudinally oriented roll axis as well as a transverse axis. In addition, there exists an unfulfilled need for such a suspension and drivetrain system which will allow extensive range of suspension travel. Furthermore, there exists an unfulfilled need for such a suspension and drivetrain which will minimize the resistive turning moments associated with the usage of a solid rear axle. Still further, there exists an unfulfilled need for such a suspension and drivetrain which will enable the use of a, proven to be superior, flexible coupling drivetrain, such as a flexible chain coupling drivetrain, including a drive sprocket and a driven sprocket. Moreover, there exists an unfulfilled need for such a suspension and drivetrain which will attain the above objectives and include provisions for a disk brake system. Lastly, there exists an unfulfilled need for such a suspension and drivetrain which is simple, compact, robust, and cost effective.

SUMMARY OF THE INVENTION

In view of the foregoing, it is an object of the present invention to provide an improved semi-independent suspension and drivetrain system for vehicles which will enable improved roll and traction performance by allowing the axle to pivot about a vehicle's longitudinally oriented roll axis as well as the transverse axis.

A second object of the present invention is to provide such an improved suspension which will allow extensive range of suspension travel.

A third object of the present invention is to provide such an improved suspension and drivetrain system which will minimize the resistive turning moments associated with the usage of a solid rear axle.

A fourth object of the present invention is to provide an improved suspension and drivetrain system which will minimize the unsprung mass of the vehicle.

A fifth object of the present invention is to provide such an improved suspension and drivetrain system enabling the use of a flexible coupling drivetrain, such as a flexible chain coupling drivetrain, including a drive sprocket and a driven sprocket.

A sixth object of the present invention is to provide an improved suspension and drivetrain system which will attain the above objectives and include optimal provisions for a disk brake system.

A seventh object of the present invention is to provide such an improved suspension and drivetrain system which is simple, compact, robust, and cost effective.

In accordance with preferred embodiments of the present invention, these objects are obtained by an integrated semi-independent suspension and drivetrain system for a vehicle including a swing arm with a swing mount for pivotally mounting the swing arm to the vehicle, an axle carrier for mounting an axle assembly, the axle carrier being rotatably mounted to the swing arm to allow the axle assembly to pivot about a suspension roll axis thus allowing the axle carrier roll about the vehicle's longitudinally oriented roll axis, a driven sprocket substantially centrally attached to the axle assembly for rotating the axle assembly, a drive sprocket for transferring rotational power to the driven sprocket, a flexible coupling mechanically linking the driven sprocket to the drive sprocket to allow transfer of rotational power from the drive sprocket to the driven sprocket, and a roll movement means for allowing the flexible coupling to maintain the mechanical link between the driven sprocket and the drive sprocket as the driven sprocket rolls about the suspension roll axis along with the axle carrier. In one embodiment of the present invention, the roll movement means includes a constant velocity (CV) joint centrally disposed on the drive sprocket to allow planar alignment of the drive sprocket relative to the driven sprocket, and a CV guide for aligning the drive sprocket with the driven sprocket, the CV guide being mounted to a CV guide mount which extends from the axle carrier to the drive sprocket.

In one embodiment of the integrated semi-independent suspension and drivetrain system, the swing arm includes at least two swing mounts which are attached to the swing arm by lateral reinforcement ribs. These lateral reinforcement ribs may include vertical reinforcement ribs. The swing arm and/or the axle carrier may include a peripheral opening on a peripheral surface to allow at least a segment of the flexible coupling, between the driven sprocket and said drive sprocket, to be outside of the swing arm and/or the axle carrier. In this embodiment, the peripheral opening is dimensioned in a manner that a clearance space exits between the flexible coupling and the peripheral opening throughout a range of motion of the flexible coupling, the range of motion being defined by rotation of the axle carrier and alignment of the driving sprocket with the driven sprocket. The integrated semi-independent suspension and drivetrain system may also include a shock mount for mounting at least one of a shock absorber and a spring. In this regard, the shock mount may be positioned proximate to the drive sprocket. In addition, the integrated semi-independent suspension and drivetrain system may include a stabilizer bar for establishing a mechanical linkage between the axle carrier and at least one of the swing arm and the vehicle in a manner to resist rotation of the axle carrier relative to the swing arm. The stabilizer bar may be attached to the axle carrier through peripheral slots provided on a peripheral surface of the swing arm.

In another embodiment of the integrated semi-independent suspension and drivetrain system, the swing arm and the axle carrier may be substantially tubular in shape with the axle carrier being dimensioned to be rotatably mounted within the swing arm. In this regard, the integrated semi-independent suspension and drivetrain system may also include two bearings mounted between the axle carrier and the swing arm to reduce friction between the axle carrier and the swing arm. In addition, the axle carrier may include at two axle mounting brackets for mounting the axle assembly, the driven sprocket being positioned thereinbetween.

In another embodiment of the present invention, the CV guide for aligning the drive sprocket with the driven sprocket includes at least a thrust bearing or a roller mounted on the CV guide mount. In this regard, the CV guide may include a CV guide which may include a first roller being mounted on said CV guide mount in a manner to contact a first surface of the drive sprocket and a second roller being mounted on said CV guide mount in a manner to contact a second surface of the drive sprocket. The integrated semi-independent suspension and drivetrain system may also include a tensioner for reducing slack in the flexible coupling, the tensioner being positioned within the axle carrier substantially midway between the driven sprocket and the drive sprocket.

In accordance with still another embodiment, an integrated semi-independent suspension and drivetrain system in accordance with the present invention may also include a brake assembly for exerting a braking force on the driven sprocket to resist rotation of the driven sprocket. In this embodiment, the driven sprocket may include a vented brake surface and the brake assembly may include a brake caliper for frictionally engaging the brake surface of the driven sprocket, the brake caliper being mounted on the axle carrier. In this regard, the driven sprocket may include an axially extending flange around a periphery of the driven sprocket. In addition, the brake assembly may include a left brake disk disposed on a left side of the driven sprocket and a right brake disk disposed on a right side of the driven sprocket. In this embodiment, the brake disks may be rotationally fixed relative to the axle assembly. Furthermore, the left brake disk and/or the right brake and/or the brake caliper may be affixed in standard floating fashion. In this regard, the driven sprocket may include a friction material that frictionally engage the left brake disk and the right brake disk. Moreover, the integrated semi-independent suspension and drivetrain system may also include a left axle and a right axle that may be mutually supported in an inter-cantilevered fashion, the left brake disk being rotationally fixed relative to the left axle and the right brake disk being rotationally fixed relative to the right axle.

An integrated semi-independent suspension and drivetrain system in accordance with yet another embodiment of the present invention may include a left axle and a right axle and the driven sprocket may include a differential gear system to allow the left axle to rotate at a different rotational speed compared to the right axle. The differential gear system may include a plurality of pinion gears, a sun gear at one end of one of the axles for engaging the plurality of pinion gears and a ring gear at one end of one of the axles for engaging the plurality of pinion gears. In this regard, the driven sprocket may include a plurality of one or more pinion constraint member(s) at a hub of the driven sprocket for mounting the pinion gears or the pinion gears may be caged between the sun gear and the ring gear by the hub of the driven sprocket. Moreover, each of the left axle and the right axle may include interior webbing.

These and other objects, features and advantages of the present invention will become more apparent from the following detailed description of the preferred embodiments of the invention when viewed in conjunction with the accompanying drawings.

BRIEF DESCRIPTION OF THE DRAWINGS

FIG. 5 is a perspective assembly view of the driven sprocket in accordance with one embodiment of the present integrated semi-independent suspension and drivetrain system.

FIG. 6 is a front assembly view of the driven sprocket of FIG. 5 but with the disk brake calliper removed.

FIG. 7 is a perspective view showing where the integrated semi-independent suspension and drivetrain system of FIG. 1 is positioned and mounted in a vehicle having four wheels.

FIG. 8 shows a frontal view of the integrated semi-independent suspension and drivetrain system of FIG. 7 during vehicle roll as viewed along the suspension roll axis.

FIG. 9 is a perspective view of another embodiment of the integrated semi-independent suspension and drivetrain system of FIG. 1 mounted in an inverted position.

DETAILED DESCRIPTION OF THE INVENTION

Figure 1:
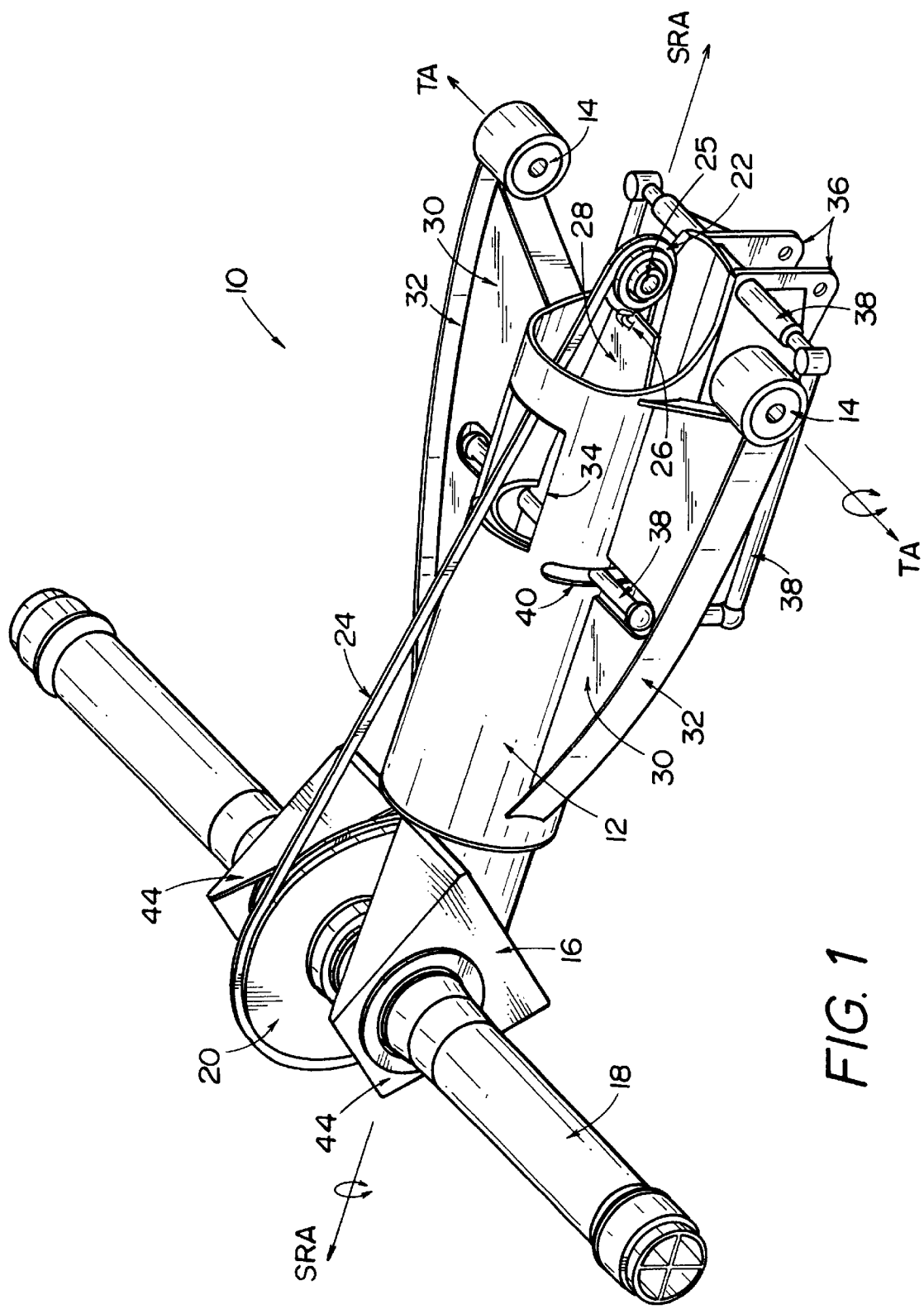
FIG. 1 is a perspective view of an integrated semi-independent suspension and drivetrain system in accordance with one embodiment of the present invention.

FIG. 1 illustrates an integrated semi-independent suspension and drivetrain 10 for vehicles in accordance with one embodiment of the present invention which will obtain the above noted objectives while avoiding the disadvantages of the prior art suspension and drivetrain designs. In particular, as will be discussed in further detail below, the integrated semi-independent suspension and drivetrain 10 will allow the rear axle to pivot about the vehicle's longitudinally oriented roll axis as well as the transverse axis thereby providing superior handling performance and extensive range of suspension travel. In addition, the illustrated embodiment of the present invention eliminates the limitations caused by the solid rear axle, minimize the unsprung mass of the vehicle, allow the use of a flexible coupling drivetrain, and allow provisions for a disk brake system. Furthermore, it will be evident that all of these objectives can be obtained in a suspension and drivetrain which is simple, compact, robust, and cost effective. Initially, it should be noted that FIG. 1 illustrates only one embodiment of the present invention which incorporates numerous features which will be described in further detail below. However, it should be recognized that the present invention may also be practiced in other embodiments where some of these features are omitted or modified. Moreover, whereas the present invention is particularly useful in ATV applications as discussed in the Background, the present invention is not limited to such applications but may be used in any vehicle or device which will benefit from having a semi-independent suspension and drivetrain system that is simple, compact, robust, and cost effective.

Figure 2:
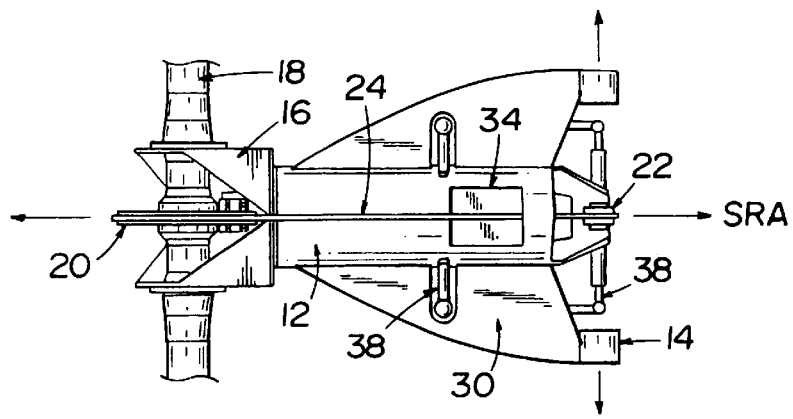
FIG. 2 is a top view of the integrated semi-independent suspension and drivetrain system of FIG. 1.

As clearly shown in FIGS. 1 and 2, one embodiment of the integrated semi-independent suspension and drivetrain 10 in accordance with the present invention includes a swing arm 12 with swing mounts 14 which pivotally mount the swing arm 12 to a vehicle (not shown) to allow the suspension and drivetrain 10 to pivot about the transverse axis TA. The suspension and drivetrain 10 also includes an axle carrier 16 for mounting an axle assembly 18, the axle carrier 16 being rotatably mounted to the swing arm 12 to allow the axle assembly 18 to roll about a suspension roll axis SRA. As can be seen, the suspension and drivetrain 10 includes a driven sprocket 20 substantially centrally attached to the axle assembly 18 for rotating the axle assembly 18 and a drive sprocket 22 for transferring rotational power to the driven sprocket 20. This transference of rotational power is obtained in the illustrated embodiment via a flexible coupling 24 which mechanically links the driven sprocket 20 to the drive sprocket 22. In this embodiment, the flexible coupling 24 is a flexible chain coupling. However, in other embodiments, a drive belt or other flexible coupling which is appropriate for transferring rotational power may also be used. In such an embodiment utilizing a drive belt, the driven sprocket 20 and drive sprocket 22 would actually be pulleys which engage the drive belt. Thus, whereas the specific embodiment described herein and shown in the drawings utilize conventional flexible chain coupling with a driven sprocket 20 and drive sprocket 22, other flexible couplings may also be used in practicing the present invention in other embodiments. In this regard, the terms driven sprocket 20 and the drive sprocket 22 should be understood and is used in the general sense to include such alternatives as pulleys.

It should be readily apparent that in the present illustrated embodiment utilizing a conventional flexible chain coupling, the axle carrier 16 is rotatably mounted to the swing arm 12, thus allowing the axle assembly 18 to roll about a suspension roll axis (SRA). Consequently, a special provision should be made in order to allow the flexible coupling 24, which may require planar orientation, to maintain the mechanical link between the driven sprocket 20 and the drive sprocket 22. In this regard, a roll movement means such as a constant velocity (a.k.a. CV) joint 25 may be provided to maintain the mechanical link between the driven sprocket 20 and the drive sprocket 22 as the driven sprocket 20 rolls about the suspension roll axis SRA with the axle carrier 16. As can be seen, in this embodiment, the CV joint 25 is centrally disposed on the drive sprocket 20 to allow maintenance of planar alignment of the drive sprocket 22 relative to the driven sprocket 20 as the driven sprocket 20 rolls about the SRA. In this regard, the present embodiment also includes a CV guide such as rollers 26 that facilitate maintenance of planar alignment of the drive sprocket 22 with the driven sprocket 20. The rollers 26, or other CV guide device, may be mounted to a CV guide mount 28 which extends from the axle carrier 16 to the drive sprocket 22 through the swing arm 12. In the illustrated embodiment, the rollers 26 contact two surfaces of the drive sprocket 22 to align the drive sprocket 22 with the driven sprocket 20. In other embodiments, the CV guide may include additional rollers (not shown) which can be mounted at a 90 degree offset, or any other degree offset, from the rollers 26 to minimize any tendency for misalignment of the drive sprocket 22. Yet in another embodiments, bearings such as thrust bearings or combination of bearings and rollers may be provided, or more generally, any combination and orientation of friction or non-friction aligning bearing elements. Furthermore, it should also be recognized that in certain embodiments, the CV joint 25 and/or CV guide device may not even be necessary in order to allow the axle carrier 16 to roll. This embodiment is especially applicable when a drive belt is used as the flexible coupling 24.

As also illustrated in FIGS. 1 and 2, the integrated semi-independent suspension and drivetrain system 10 of the present embodiment includes two swing mounts 14 which are attached to the swing arm 12 by lateral reinforcement ribs 30 which also include vertical reinforcement ribs 32. These lateral reinforcement ribs 30 provide added structural rigidity to the suspension and drivetrain system 10. As can be seen, the swing arm 12 is substantially tubular in shape and includes a peripheral opening 34 to allow at least a segment of the flexible coupling 24 to extend outside of the swing arm 12. As can be readily appreciated, the peripheral opening 34 should be properly dimensioned in a manner that a clearance space exits between the flexible coupling 24 and the peripheral opening 34 throughout a range of motion of the flexible coupling 24, the range of motion being defined by rotation of the axle carrier 16 and alignment of the drive sprocket 22 with the driven sprocket 20. In other words, because the position of the flexible coupling 24 varies depending on the amount of roll of the axle carrier 16 (and correspondingly, the drive sprocket 22), the peripheral opening 34 should be dimensioned correspondingly so that interfering contact between the flexible coupling 24 and the swing arm 12 would not occur. In alternative embodiments, the flexible coupling 24 may extend outside of the axle carrier 16 and/or the swing arm 12. In such an embodiment, the axle carrier 16 and/or the swing arm 12 may be provided with peripheral opening(s) such that a clearance space exits between the flexible coupling 24 and the peripheral opening (s) throughout a range of motion of the flexible coupling 24.

The integrated semi-independent suspension and drivetrain system 10 in accordance with the illustrated embodiment may also include a shock mount 36 proximate to the drive sprocket 22 for mounting a mono-shock absorber (not shown) or other shock absorber and/or spring device. In addition, the integrated semi-independent suspension and drivetrain system 10 also includes a stabilizer bar 38 thus establishing a mechanical linkage between the axle carrier 16 and the swing arm 12 in a manner to resist rotation of the axle carrier 16 relative to the swing arm 12. In the illustrated embodiment, the stabilizer bar 38 is attached to the swing arm 12 proximate to the shock mount 36 and is also attached to the axle carrier 16 through peripheral slots 40 provided on the swing arm 12. Further, any energy storage or dampening device, that may include coil springs, liquid or gas operated dampers, friction dampers may be linked in parallel or series with, or in place of the stabilizer bar to modify roll resistance and/or response.

Figure 3:
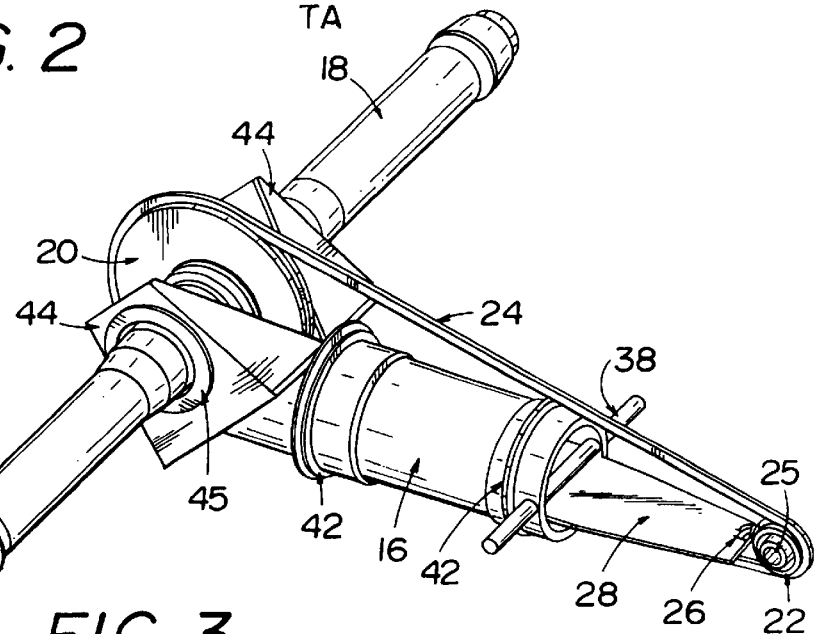
FIG. 3 is a perspective view of the integrated semi-independent suspension and drivetrain system of FIG. 1 but with the swing arm removed.

The general shape and features of the axle carrier 16 is more clearly illustrated in FIG. 3 which shows a perspective view of the integrated semi-independent suspension and drivetrain system 10 with the swing arm 12 removed. Because the swing arm 12 of the present embodiment is substantially tubular in shape, the axle carrier 16 of the present embodiment is also substantially tubular in shape and is dimensioned to be rotatably mounted to the tubular swing arm 12. In this regard, the suspension and drivetrain system 10 includes two bearings 42 mounted between the axle carrier 16 and the swing arm 12 to reduce friction as the axle carrier 16 rotates relative to the swing arm 12. In addition, the axle carrier 16 may include at two axle mounting brackets 44 and axle bearings 45 for mounting and reducing rolling friction of the axle assembly 18. As can also be seen, the driven sprocket 20 is positioned between the two axle mounting brackets 44 in the middle of the axle assembly 18.

As previously noted, the specifics and details of the components are provided as examples only and are not required to practice the present invention. For instance, different number of bearings may be provided instead of the two bearings 42. Moreover, the swing arm 12 and the axle carrier 16 need not be tubular in shape. In such instances, different member geometries and bearing support configurations may be used to provide for the relative member motions of this invention. However, in the present illustrated embodiment, swing arm 12 and axle carrier 16 having a tubular shapes are used since they provided a simple, low mass, robust, and cost effective way of practicing the present invention.

Figure 4:
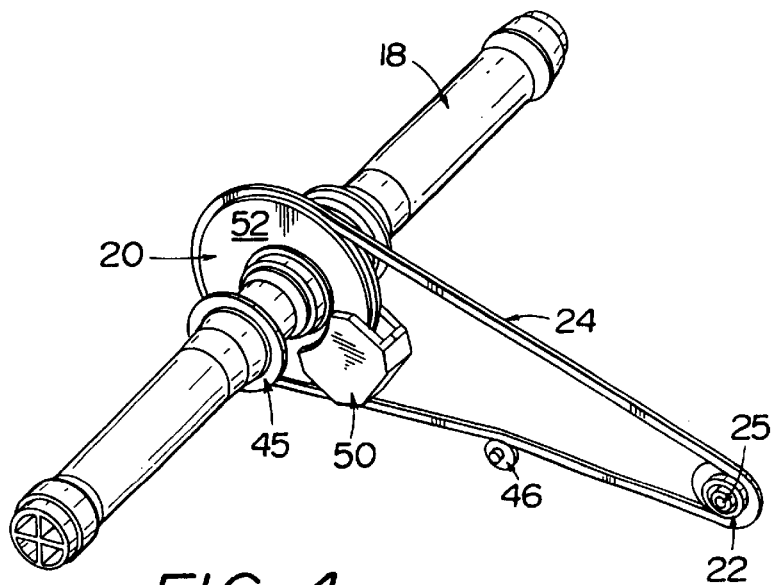
FIG. 4 is a perspective view of the integrated semi-independent suspension and drivetrain system of FIG. 3 but with the axle carrier removed.

FIG. 4 illustrates the integrated semi-independent suspension and drivetrain system 10 of FIG. 3 but with the axle carrier 16 removed. As can be clearly seen, the present illustrated embodiment also includes a tensioner 46 for reducing any slack in the flexible coupling 24. The tensioner 46 is positioned to the axle carrier 16 substantially midway between the driven sprocket 20 and the drive sprocket 22 on the side of the flexible coupling 24 which does not normally bear heavy loads.

Whereas the tensioner 46 is illustrated as being a wheeled device, it should be recognized that other tensioners known in the art may also be used. For instance, the tensioner 46 may be spring loaded wheel or a spring loaded low friction block.

As can also be seen in FIG. 4 and described in greater detail below, the illustrated embodiment of the present invention also includes a brake assembly 50 for exerting a braking force, thereby providing the braking force needed to resist rotational motion of the axle assembly 18 to stop the rear wheels.

The details of the of assembly 18 together with the brake assembly 50 and the driven sprocket 20 are best illustrated in FIGS. 5 and 6 which show assembly views of these components. As can be seen, the brake assembly 50 includes a brake caliper 54 mounted on the axle carrier 16 (not shown) for frictionally engaging the left brake disk 56 disposed on a left side of the driven sprocket 20 and a right brake disk 56' disposed on a right side of the driven sprocket 20. The left brake disk 56 and the right brake disk 56' both include a brake surface 52 which contacts brake pads (not shown) of the brake caliper 54 in a conventional manner to exert a braking force which resists the rotation of the left brake disk 56 and the right brake disk 56'. As can be seen, the suspension and drivetrain system 10 also includes a left axle 70 and a right axle 70'. The left brake disk 56 is rotationally fixed relative to the left axle 70, whereas the right brake disk 56' is rotationally fixed relative to the right axle 70'. The left and right brake disks 56 and 56' as well as the brake caliper 54 may be floating disks and caliper, the specifics of which are known and need not be detailed here. In this regard, the driven sprocket 20 may include a friction material 64 that frictionally engage the inner brake surface of left brake disk 56 and the inner brake surface of the right brake disk 56'. Thus, when pressure to the brake caliper 54 of the brake assembly 50 is applied, the rotational movement of the left brake disk 56 and the right brake disk 56' and driven sprocket 20 are robustly resisted and rotation of the left axle 70 and right axle 70' are thereby resisted. Moreover, to ensure that the brake surface 52 of the left and right brake disks 56 and 56' remains clean and free of any lubrication used (if any) for the flexible coupling 24, the driven sprocket 20 may include an axially extending flange 62 around a periphery of the driven sprocket 20 to act as a physical barrier to such lubricants or other debris which may otherwise diminish braking performance. Further, the friction material doesn't have to be fixed to the sprocket. For example, the friction material could be provided on inner surfaces of the left and right brake disks in a manner that the left and right brake disks frictionally engage the driven sprocket. In another example, the friction material may not be fixed to either the drive sprocket or the right or the left brake disks, but could be provided on a friction disk in an axial clutch-pack manner and be positioned between each of the brake disks and the driven sprocket.

As can also be seen in FIGS. 5 and 6, the axle assembly 18 in accordance with the illustrated embodiment also includes a differential gear system discussed hereinbelow which will allow the left axle 70 to rotate at a different rotational speed compared to the right axle 70' thereby eliminating the disadvantages of the solid axles used in prior art designs. In the illustrated embodiment, the differential gear system includes a plurality of pinion gears 72 (FIG. 5), a sun gear 74 integrally provided at one end of the left axle 70 and a ring gear 76 (FIG. 6) integrally provided at one end of the right axle 70'. These components are assembled in the manner shown in FIGS. 5 and 6 wherein the sun gear 74 is positioned central to the circularly positioned pinion gears 72 so that the pinion gears 72 engage the sun gear 74. The ring gear 76 is positioned on an outer periphery of the circularly positioned pinion gears 72 so that the pinion gears 72 engage the ring gear 76. This positioning of the pinion gears 72 may be attained by providing plurality of one or more pinion constraint member(s) (not shown) at the hub of the driven sprocket 20 to which the pinion gears 72 may be mounted or by simply caging the pinion gears 72 between the sun gear 74 and the ring gear 76 so that the pinion gears 72 freely rotate when there is relative rotation between the sun gear 74 and the ring gear 76. In the present embodiment, bearings 78 may be provided to reduce friction between the relative rotation of the left and right axles 70 and 70' thus providing a compact, strong, low mass integrated differential axle for the suspension and drivetrain system 10. In addition, as can be seen in these figures as well as others, the left axle 70 and the right axle 70' of the present embodiment include interior webbing 80 for substantially increased bending strength while minimizing increases in mass.

It is important to note that when utilizing the above described differential gear system in accordance with the present invention, it is desirable to dimension the sun gear 74 and the ring gear 76 such that their respective diameters are maximized and made to be nearly the same size as much as possible whereas the diameter of the pinion gears 72 is minimized. In this manner, any potential torque steer resulting from the present differential gear system will be negligible and such negative effect is clearly outweighed by the benefits of minimizing the resistive turning moments associated with the usage of a solid rear axle as used in the prior art devices.

The axle assembly 18, together with the brake assembly 50, in accordance with the present embodiment may be assembled in the following manner. The following components being assembled in position about the axle carrier. The left brake disk 56 is mounted to the left axle 70 in a keyed or splined manner so that it is rotationally fixed to the left axle 70. The plurality of pinion gears 72 are installed on the driven sprocket 20 which may include one or more pinion constraint member(s) (not shown) at the hub of the driven sprocket 20 for mounting the plurality of pinion gears 72 or otherwise caged in a circular manner by the driven sprocket hub. Then, the driven sprocket 20 with the circularly mounted plurality of pinion gears 72 are installed on to the left axle 70 so that the plurality of pinion gears 72 engage the sun gear 74 and are positioned around the sun gear 74. The right brake disk 56' is then mounted to the driven sprocket 20 together with the bearings 78. The right axle 70' is then installed on the driven sprocket 20 in a manner that the ring gear 76 engages the plurality of pinion gears 72 and the plurality of pinion gears 72 are positioned within the ring gear 76. In this manner, the left axle 70 and a right axle 70' may be mutually supported in an inter-cantilevered fashion. At the same time, the right brake disk 56' is adjusted so that it slides into a key or spline (not shown) provided on the right axle 70' thereby allowing it to be rotationally fixed to the right axle 70'. The disk brake caliper 54 is then installed onto the axle carrier 16 to enable braking.

It should be recognized that the above discussion illustrates only one embodiment of the brake assembly 50 and the axle assembly 18 and many variations may be possible with respect to these assemblies. For instance, as previously described, the friction material may be provided on a floating friction disks (not shown) in a clutch disk manner or the brake disks may include friction material fixed to inner surfaces of the brake disks (not shown) so that the brake disks frictionally engage the driven sprocket 20. In addition, the left brake disk 56 and the right brake disk 56' may be vented or be eliminated such that the brake surface is provided directly on the driven sprocket 20 itself which may also be vented. This configuration used with a solid axle would be very desirable for high powered racing applications. In addition, the sun gear 74 and the ring gear 76 need not be integrally provided on the left and right axles 70 and 70' but instead, may be separate components which are fixedly attached to the respective axles. In addition, whereas the present embodiment shows axles having interior webbing 80 for increased bending strength, such interior webbing 80 is optional and may be omitted in other axle designs or the axles may even be solid axles.

FIGS. 7 and 8 better illustrate the above described embodiment of the integrated semi-independent suspension and drivetrain system 10 in use and operation. FIG. 7 illustrates how the above described embodiment of the present invention may be mounted and used in a vehicle having four wheels. As can be clearly seen, the integrated semi-independent suspension and drivetrain system 10 is used to drive the rear wheels 2 of the vehicle (not shown), the rear wheels 2 being attached to the left and right axles of the axle assembly 18. The suspension and drivetrain system 10 is mounted to the vehicle frame (mounting points indicated as 1) via the swing mounts 14 which allows the rear wheels 2 to pivot about the transverse axis TA. As was previously explained, rotational power is transferred from the drive sprocket 22 to the driven sprocket 20 which rotates the left axle 70 and the right axle 70', which in turn, rotate the wheels 2. When the vehicle is going in straight or forward only motion, the speed of rotation of the wheels 2 and the corresponding axles are the same. In such operation, there is no relative movement in the differential system as the either axle embodiment is rotated by the driven sprocket 20. As the vehicle negotiates a turn, the left and right axles are allowed to rotate at different speeds as the sun gear 74 and the ring gear 76, both of which engage the plurality of pinion gears 72, are permitted to rotate relative to one another.

When the vehicle's body rolls or the wheels 2 go over uneven surfaces, the axle assembly 18 rolls about the suspension roll axis SRA as shown in FIG. 8. As discussed previously, this is attained in the present embodiment by providing an axle carrier 16 which is rotatably mounted to the swing arm 12. FIG. 8 also clearly illustrates the drive sprocket 22 with a CV joint which is kept in alignment with the driven sprocket 20 as the axle assembly 18 rolls about the suspension roll axis SRA. Furthermore, FIG. 8 also shows how the stabilizer bar 38 establishes a mechanical linkage between the axle carrier 16 and the swing arm 12 in a manner to resist rotation of the axle carrier 16 relative to the swing arm 12 and urges the axle carrier 16 to return to the unrotated position initially illustrated in FIG. 1.

In the above described manner, the illustrated integrated semi-independent suspension and drivetrain system 10 provides superior handling performance, extensive range of travel, eliminates the limitations caused by use of a solid rear axle, minimizes the unsprung mass, allows the use of a chain drivetrain, and also allows provisions for a disk brake system in a simple, compact, robust, and cost effective system.

Figure 10:
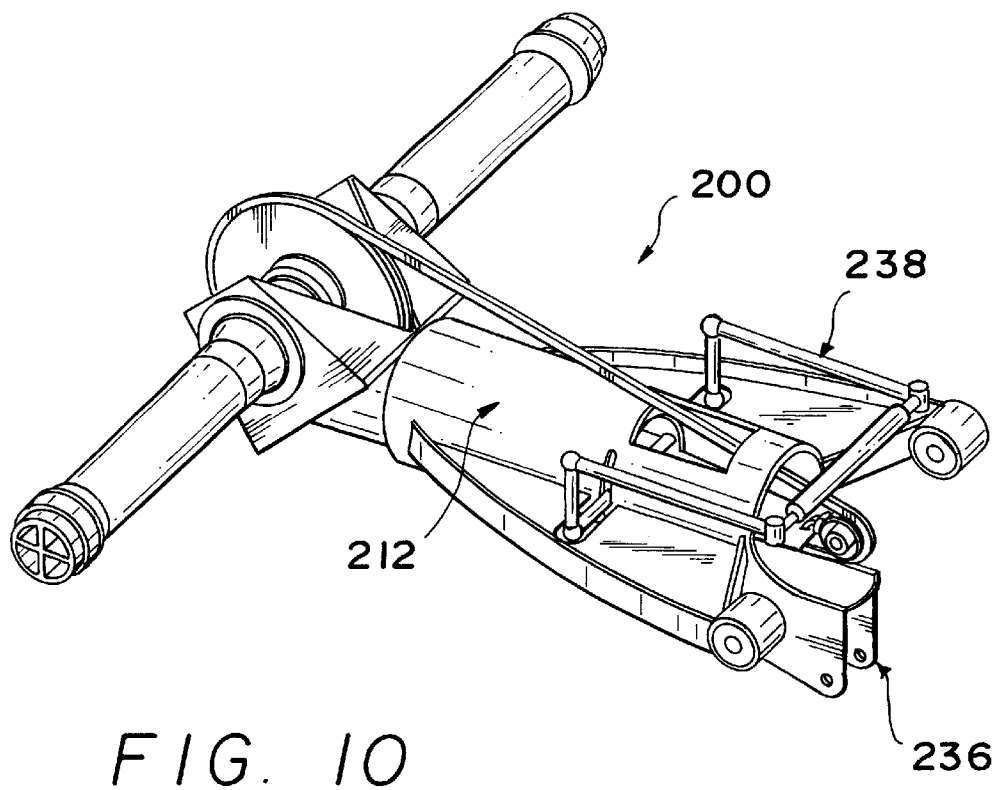
FIG. 10 is a perspective view an integrated semi-independent suspension and drivetrain system in accordance with another embodiment of the present invention.
Figure 11:
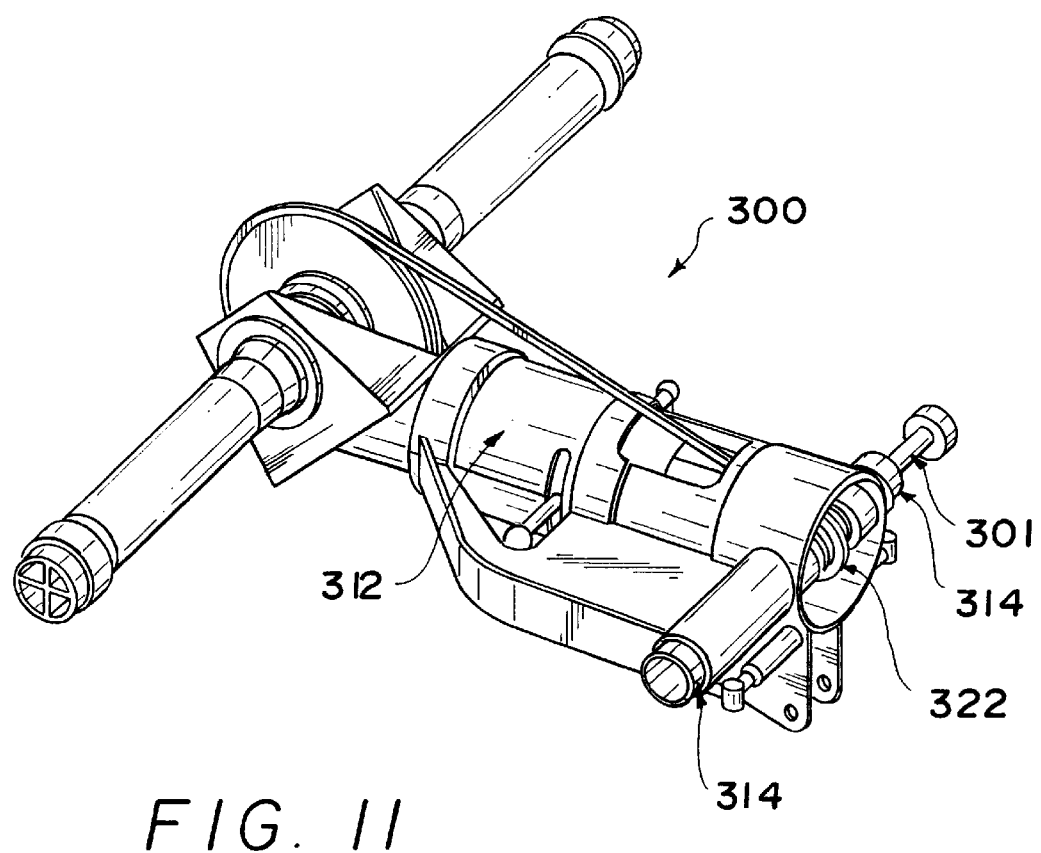
FIG. 11 is a perspective view of an integrated semi-independent suspension and drivetrain system in accordance with yet another embodiment of the present invention.

It should be noted that the above noted embodiment of the present invention may be further modified and used in a different manner. For instance, FIG. 9 illustrates an alternative application where the integrated semi-independent suspension and drivetrain 100 is essentially an inverted embodiment mounted in an inverted orientation to the embodiment of FIG. 1. As can be seen by the common enumeration, the suspension and drivetrain 100 have the same components but is mounted in an inverted orientation so that additional ground clearance may be attained. FIG. 10 illustrates a slightly modified embodiment of the embodiment shown in FIG. 1 in that the stabilizer bar 238 may be provided extending away from the swing arm 212 so as to allow mounting of the stabilizer bar 238 elsewhere on the vehicle, such as the vehicle frame, instead of by the shock mount 236. Yet another modified embodiment of the integrated semi-independent suspension and drivetrain 300 is illustrated in FIG. 11. In this embodiment, two swing mounts 314 are provided for mounting the swing arm 312 and a drive shaft 301 is attached to the drive sprocket 322 to provide rotational power thereto. This embodiment is particularly useful in applications where the vehicle transmission output (not shown) is not located on the transverse axis TA and along the vehicle centerline, since the drive shaft 301 provides an effective way for transferring the rotational power to the drive sprocket 322.

From the foregoing, it should now be apparent how the present invention provides an improved semi-independent suspension and drivetrain for vehicles which allows superior handling performance by allowing the axle to pivot about a vehicle's longitudinally oriented roll axis as well as the transverse axis TA. It can also be seen how the present invention provides for such a suspension design which allows extensive travel and eliminates the limitations caused in utilizing a solid axle. In addition, it can also be seen how the present invention provides a suspension and drivetrain which minimizes the unsprung mass of the vehicle, allows the use of a flexible chain coupling or other flexible coupling drivetrain and allows provisions for a disk brake system. Furthermore, it can be seen how the present invention provides such a suspension and drivetrain which is simple, compact, robust, and cost effective.

Further in this regard, various materials or combinations thereof can be used in the manufacturing of the suspension and drivetrain system in accordance with the present invention. For instance, for higher performance ATV racing applications, various low density, high strength metal alloys such as the newer metal matrix composites and or the more standard aluminum alloys could be used for numerous components including the swing arm, axle carrier, axle assembly, brake assembly and the driven and drive sprockets to name a few. Obviously, other nonmetallic materials may also be used for these performance applications, including composites such as carbon fiber or kevlar. Further, recreational and utility ATVs could utilize basic tubular extrusions and plate or a combination of machined castings or stampings.

While various embodiments in accordance with the present invention have been shown and described, it is understood that the invention is not limited thereto. As noted previously, the various features of the present invention may be selectively used depending on the specific application. For instance, each of the features of the present invention may be used separately depending on the application. Thus, a driven sprocket having a brake surface may be used by itself in certain applications while it may be used with the differential axle and other features of the present invention in other applications. Likewise, the differential axle may be used by itself or with other features of the present invention such as the axle carrier and/or the driven sprocket with a brake surface in other applications. It can be appreciated that many of these features, including the differential axle and the driven sprocket with a brake surface, may also be used in non-semi-independent suspensions. In addition, the driven sprocket with a brake surface may also be used in filly independent suspension designs. Furthermore, these embodiments may be changed, modified and further applied by those skilled in the art. Therefore, it should be clear that this invention is not limited to the details shown and described previously but also includes all such changes and modifications which are encompassed by the appended claims.

INDUSTRIAL APPLICABILITY

The present invention will find applicability in a wide range of vehicles including on and off road vehicles which will benefit from having a semi-independent suspension and drivetrain which is simple, compact, robust, and cost effective.

What is claimed is:

1. A drivetrain system for a vehicle comprising:
an axle carrier for mounting an axle assembly of the vehicle, said axle assembly being adapted to mount a first wheel on one end thereof, and adapted to mount a second wheel at an opposite end thereof;
a driven sprocket substantially centrally attached to said axle assembly for rotating said axle assembly, and said first wheel and said second wheel mounted to said axle assembly, said driven sprocket having a planar surface; and
a brake assembly for exerting a braking force on said planar surface of said driven sprocket to resist rotation of said driven sprocket.

2. A drivetrain system of claim 1, wherein said planar surface is a brake surface.

3. A drivetrain system of claim 2, wherein said brake surface is vented.

4. A drivetrain system of claim 2, wherein said brake assembly includes a brake caliper for frictionally engaging said brake surface of said driven sprocket.

5. A drivetrain system of claim 3, wherein said brake caliper is mounted on said axle carrier.

6. A drivetrain system for a vehicle comprising:
an axle carrier for mounting an axle assembly of the vehicle;
a driven sprocket substantially centrally attached to said axle assembly for rotating said axle assembly, said driven sprocket having a planar surface; and
a brake assembly for exerting a braking force on said planar surface of said driven sprocket to resist rotation of said driven sprocket;
wherein said driven sprocket includes an axially extending flange around a periphery of said driven sprocket, a radial dimension of said axially extending flange being smaller than a radial dimension of a plurality of teeth on said driven sprocket.

7. A drivetrain system for a vehicle comprising:
an axle carrier for mounting an axle assembly of the vehicle;
a driven sprocket substantially centrally attached to said axle assembly for rotating said axle assembly, said driven sprocket having a planar surface; and
a brake assembly for exerting a braking force on said planar surface of said driven sprocket to resist rotation of said driven sprocket;
wherein said brake assembly includes a left brake disk disposed on a left side of said driven sprocket and a right brake disk disposed on a right side of said driven sprocket.

8. A drivetrain system of claim 7, wherein at least one of said left brake disk and said right brake disk is rotationally fixed relative to said axle assembly.

9. A drivetrain system of claim 8, wherein at least one of said left brake disk and said right brake disk are floating disks and said caliper is a floating caliper.

10. A drivetrain system of claim 9, wherein said driven sprocket includes a friction material that frictionally engage said left brake disk and said right brake disk.

11. A drivetrain system of claim 9, further comprising a floating friction disk disposed between said left brake disk and said driven sprocket and another floating friction disk disposed between said right brake disk and said driven sprocket.

12. A drivetrain system of claim 9, wherein said left brake disk and said right brake disk each include a friction material on an inner surface for frictionally engaging said driven sprocket.

13. A drivetrain system of claim 7, wherein said axle assembly includes a left axle and a right axle, said left brake disk being rotationally fixed relative to said left axle and said right brake disk being rotationally fixed relative to said right axle.

14. A drivetrain system of claim 1, wherein said vehicle is a motorized cycle.

15. A drivetrain system of claim 14, wherein said motorized cycle is an all-terrain vehicle.

16. A drivetrain system of claim 1, wherein said driven sprocket is adapted to engage and be driven by a flexible coupling.

17. A drivetrain system of claim 16, wherein said flexible coupling is a chain.

18. A drivetrain system of claim 16, wherein said flexible coupling is a belt.

19. A drivetrain system for a vehicle comprising:
an axle assembly for rotatably mounting a first wheel of the vehicle at one end of said axle assembly, and a second wheel of the vehicle at a second end of said axle assembly;
a driven sprocket adapted to engage and be rotated by a flexible coupling for rotating said first and second wheels of the vehicle, said driven sprocket having a planar surface; and
a brake assembly for exerting a braking force on said planar surface of said driven sprocket to resist rotation of said driven sprocket.

20. A drivetrain system of claim 19, wherein said planar surface is a brake surface.

21. A drivetrain system of claim 20, wherein said brake surface is vented.

22. A drivetrain system of claim 20, wherein said brake assembly includes a brake caliper for frictionally engaging said brake surface of said driven sprocket.

23. A drivetrain system of claim 22, wherein said brake surface is vented.

24. A drivetrain system for a vehicle comprising:
- an axle for rotatably mounting at least one wheel of the vehicle;
- a driven sprocket adapted to engage and be rotated by a flexible coupling for rotating said at least one wheel of the vehicle, said driven sprocket having a planar surface; and
- a brake assembly for exerting a braking force on said planar surface of said driven sprocket to resist rotation of said driven sprocket;
- wherein said driven sprocket includes an axially extending flange around a periphery of said driven sprocket, a radial dimension of said axially extending flange being smaller than a radial dimension of a plurality of teeth on said driven sprocket.

25. A drivetrain system for a vehicle comprising:
- an axle for rotatably mounting at least one wheel of the vehicle;
- a driven sprocket adapted to engage and be rotated by a flexible coupling for rotating said at least one wheel of the vehicle, said driven sprocket having a planar surface; and
- a brake assembly for exerting a braking force on said planar surface of said driven sprocket to resist rotation of said driven sprocket;
- wherein said brake assembly includes a left brake disk disposed on a left side of said driven sprocket and a right brake disk disposed on a right side of said driven sprocket.

26. A drivetrain system of claim 25, wherein at least one of said left brake disk and said right brake disk is rotationally fixed relative to said driven sprocket.

27. A drivetrain system of claim 25, wherein at least one of said left brake disk and said right brake disk are floating disks.

28. A drivetrain system of claim 25, wherein said driven sprocket includes a friction material that frictionally engages said left brake disk and said right brake disk.

29. A drivetrain system of claim 27, further comprising a floating friction disk disposed between said left brake disk and said driven sprocket and another floating friction disk disposed between said right brake disk and said driven sprocket.

30. A drivetrain system of claim 27, wherein said left brake disk and said right brake disk each include a friction material on an inner surface for frictionally engaging said driven sprocket.

31. A drivetrain system of claim 25, wherein said axle assembly includes a left axle and a right axle, said left brake disk being rotationally fixed relative to said left axle and said right brake disk being rotationally fixed relative to said right axle.

32. A drivetrain system of claim 19, wherein said vehicle is a motorized cycle.

33. A drivetrain system of claim 32, wherein said motorized cycle is an all-terrain vehicle.

34. A drivetrain system of claim 19, wherein said flexible coupling is a chain.

35. A drivetrain system of claim 19, wherein said flexible coupling is a belt.

* * * * *